United States Patent
Pettersson

(10) Patent No.: US 8,967,006 B2
(45) Date of Patent: Mar. 3, 2015

(54) LINEAR ACTUATOR FOR HEIGHT ADJUSTABLE COLUMNS

(75) Inventor: Hans Pettersson, Habo (SE)

(73) Assignee: Kih-Utveckling AB, Jonkoping (SE)

( * ) Notice: Subject to any disclaimer, the term of this patent is extended or adjusted under 35 U.S.C. 154(b) by 625 days.

(21) Appl. No.: 12/951,183

(22) Filed: Nov. 22, 2010

(65) Prior Publication Data

US 2011/0120243 A1   May 26, 2011

(30) Foreign Application Priority Data

Nov. 24, 2009   (EP) ..................... 09176867

(51) Int. Cl.
| | | |
|---|---|---|
| F16H 1/20 | (2006.01) | |
| F16H 27/02 | (2006.01) | |
| F16H 55/02 | (2006.01) | |
| A47B 9/04 | (2006.01) | |
| F16H 25/20 | (2006.01) | |
| F16M 11/04 | (2006.01) | |
| F16M 11/08 | (2006.01) | |
| F16M 11/24 | (2006.01) | |
| F16M 11/28 | (2006.01) | |

(52) U.S. Cl.
CPC *A47B 9/04* (2013.01); *F16H 25/20* (2013.01); *F16H 25/2056* (2013.01); *F16M 11/04* (2013.01); *F16M 11/08* (2013.01); *F16M 11/24* (2013.01); *F16M 11/28* (2013.01); *F16M 2200/048* (2013.01)
USPC ........................ 74/89.27; 74/89.35; 74/424.95

(58) Field of Classification Search
USPC ............ 74/89.23, 89.27, 89.28, 89.29, 89.35, 74/424.76, 424.84, 424.74, 424.58, 424.8, 74/424.94, 424.95
See application file for complete search history.

(56) References Cited

U.S. PATENT DOCUMENTS

| | | | | | |
|---|---|---|---|---|---|
| 306,453 | A | * | 10/1884 | Wolcott | ................. 187/271 |
| 959,778 | A | * | 5/1910 | Melander | ................. 187/271 |
| 3,844,177 | A | * | 10/1974 | Bourassa | ................. 74/89.37 |
| 4,730,503 | A | * | 3/1988 | Rosenthal | ................. 74/58 |
| 5,311,788 | A | * | 5/1994 | Kasuga | ................. 74/89.33 |
| 5,611,508 | A | * | 3/1997 | Palmero | ................. 248/123.2 |
| 6,352,006 | B1 | * | 3/2002 | Kurashita | ................. 74/409 |
| 7,007,566 | B2 | * | 3/2006 | Norum | ................. 74/335 |

(Continued)

FOREIGN PATENT DOCUMENTS

| | | |
|---|---|---|
| DE | 3600497 A1 | 9/1986 |
| DE | 20301963 U1 | 4/2003 |

(Continued)

*Primary Examiner* — David M Fenstermacher
*Assistant Examiner* — Emily Cheng
(74) *Attorney, Agent, or Firm* — Ladas & Parry LLP

(57) ABSTRACT

A linear actuator (1), comprising a threaded spindle (10) with a longitudinal extension along a longitudinal axis (X), the spindle (10) having a right hand thread (11) and a left hand thread (12), both threads provided over a common longitudinal length of the spindle, the spindle (10) being adapted to be rotated by a driving device (60). The linear actuator further comprises a first nut member (20) provided with a right hand thread (21) and a second nut member (30) provided with a left hand thread (31). The first and the second nut members (20, 30) are in threaded connection with the spindle (10) in such a way that rotation of the spindle provides opposite linear movement of the nut members (20, 30) relative to each other along the longitudinal axis (X). Thereby, a linear actuator is provided with three parts that all move linearly relative to each other during rotation of the spindle.

12 Claims, 3 Drawing Sheets

(56) References Cited

U.S. PATENT DOCUMENTS

| | | | |
|---|---|---|---|
| 7,328,774 B2* | 2/2008 | Molnar et al. | 187/271 |
| 7,584,678 B2* | 9/2009 | Murao | 74/89.23 |
| 2002/0194783 A1* | 12/2002 | Stojc et al. | 49/118 |
| 2004/0187621 A1* | 9/2004 | Hamann et al. | 74/424.76 |
| 2010/0108843 A1* | 5/2010 | Shaffer | 248/274.1 |

FOREIGN PATENT DOCUMENTS

| | | | | |
|---|---|---|---|---|
| DE | 10160029 A1 | | 6/2003 | |
| DK | 89097 A | * | 1/1999 | ............... A47B 9/20 |
| SE | 468875 B | * | 4/1993 | ............... A47B 9/04 |
| WO | 00/71001 A1 | | 11/2000 | |
| WO | WO2009015675 A1 | * | 2/2009 | ............. F16H 25/24 |

* cited by examiner

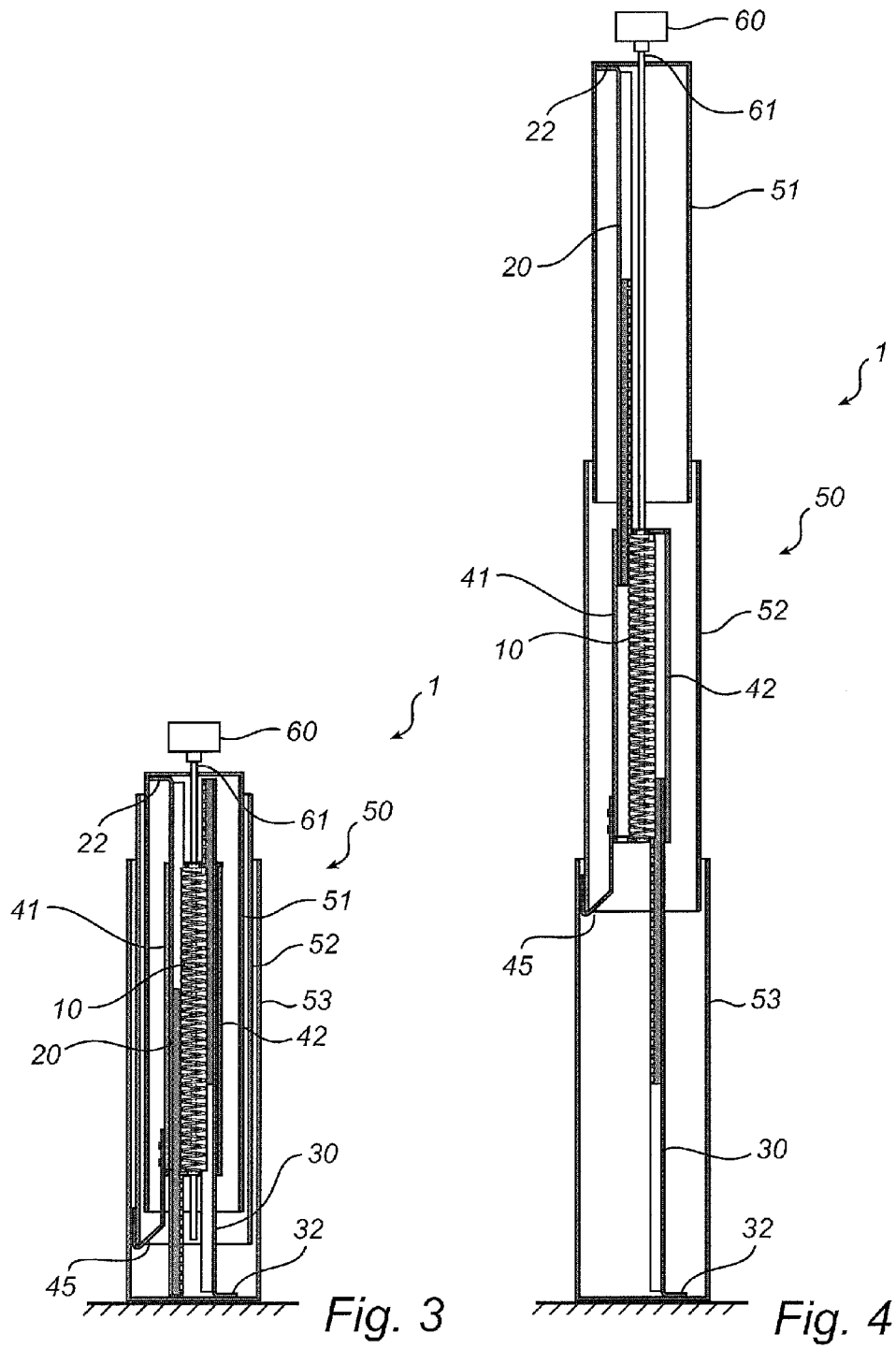

LINEAR ACTUATOR FOR HEIGHT ADJUSTABLE COLUMNS

BACKGROUND OF THE INVENTION

1. Field of the Invention

The present disclosure relates to a linear actuator for height adjustable columns.

2. Description of Related Art

Linear actuators are used in several different kinds of arrangements. Common for most linear actuators are that a rotational movement of a driving device is transformed to a linear movement of the parts of the linear actuator. One field of application of a linear actuator is in height adjustable columns for height adjustable furniture.

A common kind of linear actuator used in a leg device for furniture is disclosed in WO0071001. The leg device comprises three telescopically arranged tubes, and, inside the tube arrangement, three shafts and a driving device. The first shaft is coupled to the outgoing shaft of the driving device and attached to the inner tube. The first shaft has an external thread in threaded connection with an internal thread on the second shaft. The second shaft also has an external thread in threaded connection with an internal thread on the third shaft. The third shaft is attached to the outer tube. When the driving device rotates, the first shaft rotates and moves longitudinally relative to the second shaft. When an end position in the thread connection between the first and the second shaft is reached the rotation of the first shaft relative to the second shaft is locked so that the second shaft starts to rotate. The second shaft then moves longitudinally relative to the third shaft until the leg device is fully elongated or fully contracted.

The linear actuator in this leg device is rather complicated and a complicated arrangement is also expensive to manufacture.

Consequently, there is a need for a more cost-effective and simpler construction of a linear actuator for height adjustable columns.

BRIEF SUMMARY OF THE INVENTION

It is an object of the present invention to provide a linear actuator for height adjustable columns that alleviates the mentioned drawbacks with present devices.

This is achieved with a linear actuator according to the appended independent claim. Embodiments of the invention are presented in the dependent claims, as well as in the following description and drawings.

According to the present invention, a linear actuator for height adjustable columns is provided, comprising a threaded spindle with a longitudinal extension along a longitudinal axis, the spindle having a right hand thread and a left hand thread, both threads provided over a common longitudinal length of the spindle, the spindle being adapted to be rotated by a driving device. The linear actuator further comprises a first nut member provided with a right hand thread and a second nut member provided with a left hand thread. The first and the second nut members are in threaded connection with the spindle in such a way that rotation of the spindle provides opposite linear movement of the nut members relative to each other along the longitudinal axis.

Thereby, an automatic linear movement of the actuator is provided, wherein the movement is controlled by the rotation of the spindle. The solution is also provided in a simple and cost-effective construction. By having two nut members provided with opposite threads, both in threaded connection with the same spindle that provides both threads, the nut members will simultaneously move in linear opposite directions relative to each other when the spindle is rotated. Each of the nut members moves linearly relative to the spindle along the longitudinal axis. Compared to prior art, the solution becomes more cost-effective due to the low amount of parts, with only one spindle instead of three shafts as in WO0071001.

A further advantage of the linear actuator is that three separate parts are provided that all linearly can move relative to each other. Thereby, the linear actuator may be provided in a leg device, similar to the leg device in WO0071001, wherein three tubes are coupled to the first nut member, the second nut member and to the spindle respectively. Due to rotation of the spindle the three tubes will then move linearly relative to each other. Each tube will move relative to each of the other two tubes. Differences to WO0071001 are that the linear movement is provided by fewer parts and the nut members (the inner and the outer tubes) both move relative to the spindle (the middle tube) simultaneously and with the same speed.

In a further embodiment the first and the second nut members may be in threaded connection with the spindle in such a way that rotation of the spindle provides opposite linear movement of the nut members relative to each other along the longitudinal axis between a first end position and a second end position, wherein the first end position represents the most contracted state of the linear actuator and the second end position represents the most elongated state of the linear actuator, and wherein at least a portion of the two nut members, at at least one intermediate position between the end positions, both are in connection with a common longitudinal portion of the spindle.

Thereby, the linear actuator may provide a large length of stroke. I.e. the difference in longitudinal length of the linear actuator between the end positions may be larger than if the nut members could not be in connection with the same longitudinal portion of the spindle. When the linear actuator is in the first end position, i.e. the most contracted state, the longitudinal length of the actuator is not substantially longer than the length of one of the nut members. Such state may provide that both nut members elongate along substantially the spindle's entire longitudinal length and are in threaded connection with a substantial part of the spindle's longitudinal length. On the other hand, when the linear actuator is in the second end position, i.e. the most elongated state of the linear actuator, the two nut members may be in connection with separate portions of the spindle. Each of the nut members may, in the second end position, extend with a main part of its longitudinal length outside the longitudinal extension of the spindle. Preferably at least 80% of the nut member extends outside the extension of the spindle. The amount of a nut member that extends outside the extension of the spindle in the second end position may however depend on the amount of load on the actuator. The more load on the actuator, the less of the nut member may extend outside the extension of the spindle in the second end position. With very small load on the actuator, only a very short part of a nut member needs to be in connection with the spindle in the second end position.

In one embodiment the first nut member may bear against a first portion of the circumference of the spindle, and similarly the second nut member may bear against a second portion of the circumference of the spindle, the second portion being opposite the first portion, such that the first and the second nut members together bear against the whole circumference of the spindle or less than the whole circumference of the spindle.

Since each nut member may not surround the entire circumference of the spindle, both nut members may be in threaded connection with the spindle and still be able to both be in connection with a common longitudinal portion of the spindle. The nut members may bear against the spindle such that the entire circumference of the spindle is covered by the nut members together. The nut members may also bear against the first and second portions of the circumference of the spindle such that the first and second portions together are less than the whole circumference of the spindle. Thereby, the nut members leave one or two open portions along the circumference of the spindle to which open portions none of the nut members bear. The two portions of the circumference to which the nut members bear may both be equal to or less than half of the whole circumference of the spindle. Further, one of the nut members may bear against a portion of the circumference that is more than half of the circumference of the spindle, and the other nut member may then bear against a portion that is equal to or less than the remaining portion of the circumference of the spindle. By an opposite portion of the circumference of the spindle is meant, as seen in a cross-section of the spindle, a portion that is on the opposite side of the spindle compared to a first portion.

In another embodiment the nut members each extend along the longitudinal axis in a length at least as long as the longitudinal length of the spindle.

The length of stroke of the linear actuator depends on the difference between the shortest and longest longitudinal length of the linear actuator. Since the shortest length of the actuator may not be shorter than the spindle, it is preferred that the longitudinal lengths of the nut members are at least as long as the longitudinal length of the spindle to provide the largest length of stroke. The difference in longitudinal length between the most elongated state and the most contracted state of the linear actuator is the largest when the nut members have the same longitudinal length as the spindle.

In one embodiment the linear actuator further comprises a holding device arranged to hold the first and second nut members in threaded connection with the spindle.

Thereby, the nut members may be pressed against the spindle by the holding device. This is advantageous since it provides the possibility for the nut members only to bear against a portion of the circumference of the spindle. Otherwise the nut members would not stay in threaded connection with the spindle unless the nut members each surround substantially the entire circumference of the spindle.

In another embodiment the holding device comprises a first holding part and a second holding part arranged to abut the two nut members, and wherein the first holding part is arranged to hold the first nut member in threaded connection with the spindle and the second holding part is arranged to hold the second nut member in threaded connection with the spindle.

By providing two holding parts, the assembly of the linear actuator may be facilitated. Further, the two holding parts may be provided as two complementary formed parts, providing more cost-effective manufacture. The holding parts may be attached to each other to press the nut members towards the spindle, the two holding parts pressing from opposite sides. The holding device may be fixed relative to the spindle. The holding device may be provided with at least one opening for at least one of the nut members. Thereby, the nut members may move relative to the holding device through the opening and be of a longer longitudinal length than the holding device. The holding device may further in one embodiment be provided with at least one bracket for fixating the spindle relative to the holding device in a longitudinal direction. The holding device may further be provided with an opening for receiving a driving shaft from a driving device to the spindle, the spindle being adapted to be rotated by the driving device via the driving shaft. The opening in the holding device for receiving the driving shaft may extend along the longitudinal axis.

In one embodiment the spindle may be hollow, providing an opening from an end of the spindle along the longitudinal axis for receiving a driving shaft from a driving device. In a further embodiment the longitudinal opening in the spindle may provide an angular cross-sectional shape to receive a complementary angularly cross-sectional shaped driving shaft.

Thereby, the spindle may be rotated by the driving device, via the driving shaft by receiving the driving shaft in the opening along the longitudinal axis. The driving shaft may be rotational prevented relative to the spindle. I.e. both the spindle and the driving shaft may have shapes that complement each other in such a way that the spindle may rotate when the driving shaft rotates. An angular shape of the cross-section of the opening and a complementary angular cross-sectional shape of the driving shaft may provide such a rotational prevented engagement. The driving shaft may however still be moveable relative to the spindle in a linear longitudinal direction along the longitudinal axis.

According to one embodiment of the invention, a linear actuator may be provided further comprising an inner tube, a middle tube and an outer tube, wherein said tubes may be arranged for telescopic movement relative to each other.

By providing the linear actuator with a telescopic tube arrangement it may provide use of the actuator for height adjustable columns as e.g. a leg device. The leg device may for instance be used for height adjustable furniture. Such height adjustable leg device may provide a simpler and more cost-effective construction compared to prior height adjustable leg devices.

In a further embodiment the inner tube may be attached to the first nut member, the outer tube may be attached to the second nut member and the middle tube may be coupled to the spindle.

Thereby, a telescopic movement of the tubes relative to each other may take place when the spindle is rotated. With the linear actuator in its most contracted state, the spindle may be rotated providing an opposite linear movement of the nut members relative to each other towards the most elongated state of the actuator. The middle tube may be coupled to the spindle by being attached to the holding device. When the middle tube is attached to the holding device and the inner tube is attached to the first nut member, the inner tube may be pushed away from the middle tube in a telescopic movement when the first nut member moves relative to the spindle. Similarly the outer tube attached to the second nut member may be pushed away from the middle tube when the second nut member moves relative to the spindle. This provides a telescopic elongation of the leg device. When the spindle is rotated in the opposite direction, the nut members move linearly into the holding device, towards a more contracted state wherein the nut members bear against a larger part of the spindle than before, providing a shorter longitudinal length of the linear actuator. With the tubes attached to the nut members and to the holding device, the middle tube is pushed into the outer tube when the second nut member moves into the holding device. Similarly, the inner tube is pushed into the middle tube when the first nut member moves into the holding device. A further advantage of this embodiment is that the telescopic elongation and contraction is provided synchronically in a simple construction. I.e. the inner tube and the outer tube are both moving relative to the middle tube simultaneously and with the same speed during elongation or contraction of the leg device. No special arrangement is needed to achieve the synchronic telescopic movement since it is provided automatically be the linear actuator.

BRIEF DESCRIPTION OF THE SEVERAL VIEWS OF THE DRAWINGS

The invention will in the following be described in more detail with reference to the enclosed drawings, wherein:

FIG. 3 is a schematic cross-sectional view along a longitudinal axis of a linear actuator according to an embodiment of the invention in a contracted state.

FIG. 4 is a schematic cross-sectional view along a longitudinal axis of a linear actuator according to an embodiment of the invention in an elongated state.

DETAILED DESCRIPTION OF THE INVENTION

Figure 1:
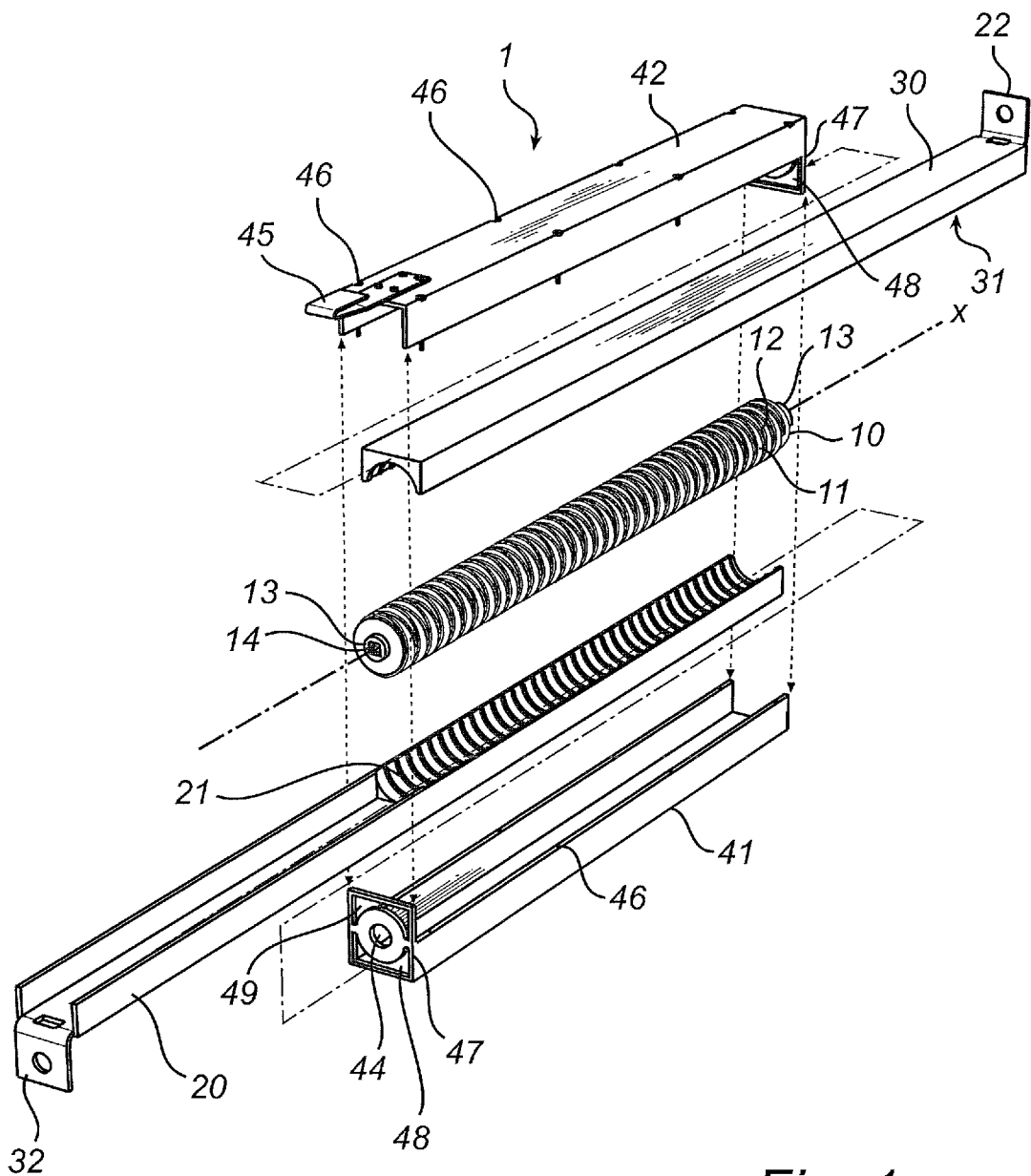
FIG. 1 is an exploded view of the parts of a linear actuator according to the invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

The linear actuator 1 according to the invention is described in FIG. 1. The actuator 1 comprises a threaded spindle 10 with a longitudinal extension along a longitudinal axis X, and is provided with both a right hand thread 11 and a left hand thread 12. Both threads are provided over substantially the entire longitudinal length of the spindle 10. The thread pitch of each of the threads 11, 12 is about 1 thread/cm. The spindle 10 is adapted to be rotated by a driving device. It is therefore hollow, provided with a longitudinal opening 14 to receive a driving shaft 61. The spindle 10 is adapted to be rotational prevented relative to a driving shaft 61 by providing the longitudinal opening 14 with an angular shape, preferably a hexagon shape or a square shape. The longitudinal opening is then adapted to receive a driving shaft 61 with a corresponding shape.

A first nut member 20 is arranged in threaded connection with the right hand thread 11 of the spindle 10. The first nut member 20 extends along the longitudinal axis X and is provided with a right hand thread 21 corresponding to the right hand thread 11 of the spindle 10. A second nut member 30 is in threaded connection with the left hand thread 12 of the spindle 10. The second nut member 30 extends along the longitudinal axis X and is provided with a left hand thread 31 corresponding to the left hand thread 12 of the spindle 10. The longitudinal lengths of the nut members 20, 30 are substantially the same, and are about 30% longer than the longitudinal length of the spindle 10. A cross-section of each of the nut members 20, 30 provides a U-shape with the threads 21, 31 provided on the inside of the U. The outsides of the nut members 20, 30 are square shaped with right angles. The nut members 20, 30 are provided with threads 21, 31 along at least half of their longitudinal lengths.

When the spindle 10 is rotated, both nut members 20, 30 each move linearly along the longitudinal axis X relative to the spindle 10, due to the threaded connection between the spindle 10 and each of the nut members 20, 30. Since the two nut members 20, 30 are provided with threads 21, 31 of opposite directions, the nut members 20, 30 move linearly along the longitudinal axis X in opposite directions relative to each other during rotation of the spindle 10.

Each of the nut members 20, 30 only bear against a portion of the circumference of the spindle 10. Thereby, the nut members 20, 30 can be in threaded connection with the same longitudinal part of the spindle 10 at the same time.

Figure 2:
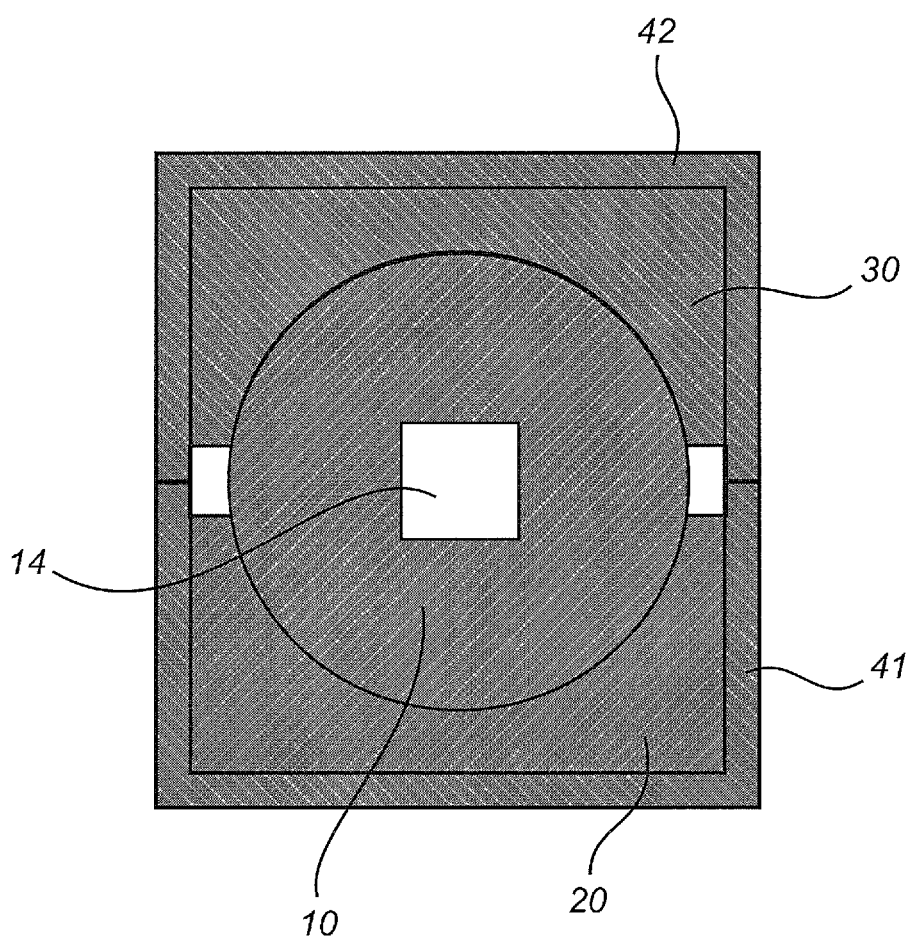
FIG. 2 is a cross-sectional view, in a plane perpendicular to a longitudinal axis, of the linear actuator according to FIG. 1.

FIG. 2 describes a cross-section of the linear actuator 1 with the first nut member 20 and the second nut member 30 bearing against the spindle 10. There are two portions, on each side of the spindle 10, of the circumference of the spindle 10 not covered by any of the nut members 20, 30. The nut members 20, 30 could in another embodiment each cover a larger portion of the circumference of the spindle 10 such that the entire circumference of the spindle 10 is covered by the nut members 20, 30. The longitudinal opening 14 in the spindle 10 is preferably square-shaped. It may also have another angular shape, such as a hexagonal shape. However, it is essential that the shape of the opening 14 corresponds to the shape of the driving shaft 61 adapted to fit in the opening 14.

Outside of the nut members 20, 30 in a radial direction from the longitudinal axis X is a holding device 41, 42 provided. The holding device 41, 42 is formed as an elongated hollow box with four long sides and two short sides 47. The holding device 41, 42 comprises a first holding part 41 and a second holding part 42, as seen in FIG. 1 and FIG. 2. The holding parts 41, 42 abut the nut members 20, 30 in order to hold the nut members 20, 30 in the threaded connection with the spindle 10. The holding parts 41, 42 also hold the nut members 20, 30 in a rotational prevented position relative to each other and relative to the holding parts 41, 42. This is provided by the square shapes of the nut members 20, 30 and the holding parts 41, 42. The holding parts 41, 42 are adapted to be attached to each other and are therefore provided with holes 46 for receiving fastening means. The fastening means is preferably screws and nuts or the like. The holding parts 41, 42 are formed as two complementary formed parts, providing the same shape. The holding parts 41, 42 provide a cross-section with a U-shape, showing half a square, except at one short side 47 each wherein a complete square shape is provided.

The holding parts 41, 42 together surround the entire circumference of the nut members 20, 30 along the longitudinal length of the spindle 10. Referring to FIG. 2, the holding parts 41, 42 abut each other at the same horizontal plane as where the portions of the circumference of the spindle 10 not covered by any nut member 20, 30 are situated. The holding parts 41, 42 may as well be rotated a quarter of a turn to abut each other in a vertical plane in an orientation as shown in FIG. 2.

At the short sides 47 of the holding parts 41, 42 are openings 48, 49 provided for the nut members 20, 30 to be able to extend outside the holding parts 41, 42 along the longitudinal axis X. Each of the holding parts 41, 42 provides one short side 47 that each provides two nut member openings 48, 49. I.e. both short sides 47 provide an opening for the first nut member 48 and an opening for the second nut member 49. During linear movement of the nut members 20, 30, the nut members 20, 30 move through the openings 48, 49 in the holding parts.

The short sides 47 of the holding parts 41, 42 further provides an opening 44 for receiving a driving shaft 61 to the spindle 10. The opening 44 is circular and further functions as a bracket to hold the spindle 10. Each end of the spindle 10 is provided with a circular end piece 13, adapted to fit in the circular openings 44 on the holding parts 41, 42. The end pieces 13 of the spindle 10 rotate in the bracket such that the bracket also functions as a bearing for the spindle. When the end pieces 13 are fitted into the openings 44, the spindle 10 rotates relative to the holding parts 41, 42. Since the nut members 20, 30 are rotational prevented relative to the holding parts 41, 42, the spindle 10 can also rotate relative to the nut members 20, 30. When the spindle 10 is mounted in the holding part openings 44, the spindle 10 is fixed relative to the holding parts 41, 42 in the longitudinal direction since the end pieces 13 are fitted in the openings 44.

In the most contracted state of the linear actuator 1 the nut members 20, 30 both are in threaded connection with the spindle 10 over substantially the nut members' entire longitudinal length. The nut members 20, 30 are of substantially the same length. They also both bear against the spindle 10 along substantially the spindle's entire longitudinal length. When the linear actuator 1 is in its most elongated state, the nut members 20, 30 have moved linearly in opposite directions relative to each other so far that they do not bear against a common longitudinal portion of the spindle 10. However, the nut members 20, 30 have not, in the most elongated state of the actuator 1, moved so far in the longitudinal direction that they lose the threaded connection with the spindle 10. The amount of the length of the nut members 20, 30 that should still be in connection with the spindle 10 in the most elongated state of the actuator 1 depends on the load on the actuator 1. The smaller load on the actuator 1 the smaller amount of the length of the nut members 20, 30 need to be in connection with the spindle. A limit is set for the driving device to prevent elongation past an end position.

As described in FIG. 3, the linear actuator further comprises, in an alternative embodiment of the invention, a tube arrangement 50 comprising an inner tube 51, a middle tube 52 and an outer tube 53, showed in an elongated state. The first nut member 20 is attached to the free end of the inner tube 51 via an attachment means 22. The second nut member 30 is attached to the free end of the outer tube 53 via an attachment means 32. The holding device 40 is attached to the end of the middle tube 52 that is proximal to the outer tube 53, via an attachment means 45.

The linear actuator 1 then provides a leg device wherein the spindle 10 is adapted to be rotated by a driving device 60 via the driving shaft 61. The inner tube 51, and the first nut member 20, is fixed relative to the driving device 60. The driving shaft 61 elongates through the inner tube 51 and is received by the spindle 10. Starting in an elongated state of the linear actuator 1, the spindle 10 is rotated providing linear movement of the first nut member 20 and the second nut member 30 in opposite directions relative to each other such that they are both moving further into the holding device 40. Due to the connection between the second nut member 30 and the outer tube 53, and the connection between the holding device 40 and the middle tube 52, the middle tube 52 is pushed into the outer tube 53. Similarly, the inner tube 51 is pushed into the middle tube 52 when the first nut member 20 moves relative to the spindle 10 along the longitudinal axis X towards a contracted state of the linear actuator 1. Thereby is the telescopic movement of the tubes 51, 52, 53 taking place. Both the right hand threads 11, 21 and the left hand threads 12, 31 on the spindle 10 and the nut members 20, 30 have the same thread pitch, about 1 thread per cm. Therefore, the nut members 20, 30 both move along the longitudinal axis X relative to the spindle 10 with the same speed, but in opposite directions. This provides a synchronic movement of the nut members 20, 30 relative to the spindle 10 when the spindle 10 is rotated, and consequently also a synchronic telescopic movement of the telescopic tube arrangement 50. The inner tube 51 moves relative to the outer tube 53 with twice the speed relative to the middle tube 52 along the longitudinal axis X.

Since the first nut member 20 is fixed relative to the driving device 60 and the driving shaft 61 in the longitudinal direction, the driving shaft 61 moves along the longitudinal axis X relative to the spindle 10. When the linear actuator 1 is contracting, the driving shaft 61 is pushed into the longitudinal opening 14 of the spindle 10.

The driving device 60 may in an alternative embodiment be situated at the free end of the outer tube 53, such that the driving device 60 and the driving shaft 61 is fixed in the longitudinal direction relative to the outer tube 53. The driving shaft 61 may then elongate through the outer tube 53 instead of the inner tube 51, and be received by the spindle 10 at its opposite end.

FIG. 4 describes the most contracted state of the linear actuator 1 comprising the tube arrangement 50. The nut members 20, 30 elongate along the entire longitudinal length of the spindle 10 and are both in threaded connection with the spindle 10 along a substantial part of that length.

The spindle 10 and the holding device 40 are preferably of a plastic material. The nut members 20, 30 are preferably made of a plastic material with sheet metal reinforcements, or entirely of metal.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A linear actuator (1) for height adjustable columns comprising:
   a threaded spindle (10) with a longitudinal extension along a longitudinal axis (X), characterized in that the spindle has a right hand thread (11) and a left hand thread (12), both threads provided over an entire common longitudinal portion of the spindle, the spindle being adapted to be rotated by a driving device (60), the linear actuator further comprising:
   a first nut member (20) provided with a right hand thread (21), and
   a second nut member (30) provided with a left hand thread (31),
   wherein the first and the second nut members are in threaded connection with the spindle in such a way that rotation of the spindle provides opposite linear movement of the nut members relative to each other along the longitudinal axis,
   wherein the first nut member (20) bears against a first portion of the circumference of the spindle (10), and the second nut member (30) bears against a second portion of the circumference of the spindle, the second portion being opposite the first portion, such that the first and the second nut members together bear against less than the whole circumference of the spindle,
   wherein the linear actuator further comprises a holding device (41, 42) arranged to hold the first and the second nut members in threaded connection with the spindle,
   wherein the holding device comprises a first holding part (41) and a second holding part (42) arranged to abut the two nut members, and wherein the first holding part is arranged to hold the first nut member in threaded connection with the spindle and the second holding part is arranged to hold the second nut member in threaded connection with the spindle, and wherein the first and second holding parts together surround the entire circumference of the first and second nut members.

2. The linear actuator according to claim 1, wherein the first (20) and the second (30) nut members are in threaded connection with the spindle (10) in such a way that rotation of the spindle provides opposite linear movement of the nut members relative to each other along the longitudinal axis (X) between a first end position of the linear actuator and a second end position of the linear actuator, wherein the first end position represents the most contracted state of the linear actuator and the second end position represents the most elongated state of the linear actuator, and wherein at least a portion of each of the two nut members, when at an intermediate position between the end positions, are in connection with the entire common longitudinal portion of the spindle.

3. The linear actuator according to claim 1 or 2, wherein the nut members (20, 30) each has a length along the longitudinal axis (X) that is at least as long as the longitudinal length of the spindle (10).

4. The linear actuator according to claim 1 or 2, wherein the spindle (10) is hollow providing an opening (14) from an end of the spindle along the longitudinal axis (X) for receiving a driving shaft (61) from the driving device.

5. The linear actuator according to claim 4, wherein the longitudinal opening (14) in the spindle has an angular cross-sectional shape to receive a complementary angularly cross-sectional shaped driving shaft (61).

6. The linear actuator according to claim 1 or 2, wherein the linear actuator further comprises an inner tube (51), a middle tube (52) and an outer tube (53), said tubes are arranged for telescopic movement relative to each other.

7. The linear actuator according to claim 6, wherein the inner tube (51) is attached to the first nut member (20), the outer tube (53) is attached to the second nut member (30) and the middle tube (52) is coupled to the spindle (10).

8. The linear actuator according to claim 1 or 2, wherein the linear actuator further comprises the driving device (60) and a driving shaft (61) connected to the driving device, the driving shaft being further connected to the spindle (10) such that when the driving shaft is rotated by the driving device (60), the spindle is rotated.

9. The linear actuator according to claim 1, wherein the holding device (41, 42) has at least one opening (48, 49) for receiving at least one nut member, through which opening the nut member moves during linear movement of the nut member along the longitudinal axis.

10. The linear actuator according to claim 1, wherein the holding device (41, 42) provides at least one bracket (44) for fixating the spindle (10) relative to the holding device in a longitudinal direction.

11. The linear actuator according to claim 10, wherein the bracket (44) is provided with at least one bearing for an end (13) of the spindle for the spindle to rotate relative to the holding device.

12. The linear actuator according to claim 1, wherein the holding device has an opening (44) for receiving a driving shaft (61) from the driving device (60) to the spindle.

* * * * *